(12) United States Patent
Switkin et al.

(10) Patent No.: US 9,185,148 B1
(45) Date of Patent: Nov. 10, 2015

(54) METHODS AND SYSTEMS FOR EFFICIENT DISCOVERY OF DEVICES IN A PEER-TO-PEER NETWORK

(71) Applicant: Google Inc., Mountain View, CA (US)

(72) Inventors: Daniel Jules Switkin, Brooklyn, NY (US); Benjamin Margolin, San Mateo, CA (US)

(73) Assignee: Google Inc., Mountain View, CA (US)

( * ) Notice: Subject to any disclaimer, the term of this patent is extended or adjusted under 35 U.S.C. 154(b) by 444 days.

(21) Appl. No.: 13/716,675

(22) Filed: Dec. 17, 2012

(51) Int. Cl.
   *G06F 15/16* (2006.01)
   *H04L 29/06* (2006.01)

(52) U.S. Cl.
   CPC .................................. *H04L 65/403* (2013.01)

(58) Field of Classification Search
   USPC ......... 709/227, 228, 230, 237, 245, 220, 223, 709/225
   See application file for complete search history.

(56) References Cited

U.S. PATENT DOCUMENTS

| | | | |
|---|---|---|---|
| 7,215,923 B2 * | 5/2007 | Hillyard | 455/41.1 |
| 8,103,718 B2 | 1/2012 | O'Shea et al. | |
| 8,116,749 B2 | 2/2012 | Proctor, Jr. et al. | |
| 2008/0182591 A1 | 7/2008 | Krikorian | |
| 2012/0331155 A1 * | 12/2012 | Sunderrajan et al. | 709/227 |
| 2013/0103797 A1 * | 4/2013 | Park et al. | 709/217 |
| 2013/0297810 A1 * | 11/2013 | Ho et al. | 709/228 |
| 2013/0325949 A1 * | 12/2013 | Virani et al. | 709/204 |

* cited by examiner

*Primary Examiner* — Viet Vu
(74) *Attorney, Agent, or Firm* — McDonnell Boehnen Hulbert & Berghoff LLP (57) ABSTRACT

When attempting to establish a peer-to-peer connection, a computing device can quickly discover compatible devices, which are capable of exchanging content, and remember them. When a neighboring device is discovered during a scan, the computing device can determine whether the neighboring device is capable of sharing content. Once it is determine that the neighboring device can share content, the computing device can determine a history of previous connections with the neighboring device. The computing device can determine a priority for sharing content with neighboring device relative to other devices. The computing device can determine the priority based on the history of the neighboring device and the history of other devices so that the devices with a likelihood of new content receive a higher priority.

20 Claims, 5 Drawing Sheets

METHODS AND SYSTEMS FOR EFFICIENT DISCOVERY OF DEVICES IN A PEER-TO-PEER NETWORK

TECHNICAL FIELD

This disclosure relates generally to the transfer of content between computing devices.

BACKGROUND

Presently, many people utilize their mobile devices to view and manage content such as videos, music, and pictures. Often, people share content between the mobile devices by establishing a peer-to-peer connection using various types of wireless protocols. For example, one user may transfer a video file to another user over a BLUETOOTH connection and request similar content from the other user. This process, however, can be inefficient. Typically, when the user transfers the video file to the other user, the user must specify the files to share with the other user. This process does not account for the situation where the other user may already have obtained the files or is not interested in the files. As such, the communication of the redundant or unwanted files can drain the batteries of the mobile devices and tie-up network bandwidth of the users. Further, this procedure utilizes many requests and replies between the mobile devices, which can drain the batteries of the mobile devices and over-utilize the network connections of the users. Additionally, current peer-to-peer technology does not allow for easy discovery of devices that are capable of sharing content. Accordingly, there is need a more efficient method for discovering devices with which to share content over peer-to-peer network connection.

SUMMARY

Implementations of the present teachings relate to methods for bi-directional transfer of data. The methods include identifying, by a first computing device, a second device with which to attempt a peer-to-peer connection. The methods also include determining that the second device is a device capable of sharing content. Further, the methods include determining that a previous peer-to-peer connection was made with the second device. Additionally, the methods include retrieving data reflecting the previous peer-to-peer connection, wherein the data comprises a time of the previous peer-to-peer connection and whether content sharing was successfully completed during the previous peer-to-peer connection. The methods also include determining a priority with which to attempt the peer-to-peer connection with the second device relative to connections with other devices based on at least one of the time of the previous peer-to-peer connection and whether content sharing was successfully completed during the previous peer-to-peer connection.

Implementations of the present teachings also relate to a computer readable storage media comprising instructions for causing one or more processors to perform methods. The methods include identifying, by a first computing device, a second device with which to attempt a peer-to-peer connection. The methods also include determining that the second device is a device capable of sharing content. Further, the methods include determining that a previous peer-to-peer connection was made with the second device. Additionally, the methods include retrieving data reflecting the previous peer-to-peer connection, wherein the data comprises a time of the previous peer-to-peer connection and whether content sharing was successfully completed during the previous peer-to-peer connection. The methods also include determining a priority with which to attempt the peer-to-peer connection with the second device relative to connections with other devices based on at least one of the time of the previous peer-to-peer connection and whether content sharing was successfully completed during the previous peer-to-peer connection.

Implementations of the present teachings also relate to computing devices comprising one or memory devices storing instructions and one or more processors coupled to the one or more memory devices. The one or more processors are configured to execute the instructions to perform methods. The methods include identifying a second device with which to attempt a peer-to-peer connection. The methods also include determining that the second device is a device capable of sharing content. Additionally, the methods include determining that a previous peer-to-peer connection was made with the second device. Further, the methods include retrieving data reflecting the previous peer-to-peer connection, wherein the data comprises a time of the previous peer-to-peer connection and whether content sharing was successfully completed during the previous peer-to-peer connection. The methods also include determining a priority with which to attempt the peer-to-peer connection with the second device relative to connections with other devices based on at least one of the time of the previous peer-to-peer connection and whether content sharing was successfully completed during the previous peer-to-peer connection.

BRIEF DESCRIPTION OF THE DRAWINGS

Various features of the implementations can be more fully appreciated, as the same become better understood with reference to the following detailed description of the implementations when considered in connection with the accompanying figures, in which.

DETAILED DESCRIPTION

For simplicity and illustrative purposes, the principles of the present teachings are described by referring mainly to examples of various implementations thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific examples of various implementations. Electrical, mechanical, logical and structural changes can be made to the examples of the various implementations without departing from the spirit and scope of the present teachings. The following detailed description is, therefore, not to be taken in a limiting sense and the scope of the present teachings is defined by the appended claims and their equivalents.

Implementations of the present disclosure are related to systems and methods for efficient discovery of neighboring devices in a peer-to-peer network, such as mobile phones, laptop computers, desktop computers, server computers, tablet computers, and the like. According to implementations, when attempting to establish a peer-to-peer connection, a computing device can quickly discover compatible devices, which are capable of exchanging content, and remember them. To achieve this, the computing device can operate both as a server and a client. That is, the computing device can maintain an open listening socket to accept incoming connections, in addition to scanning for neighboring devices to make outgoing connections.

According to implementations, when a neighboring device is discovered during a scan, the computing device can determine whether the neighboring device is capable of sharing content. The computing device can determine whether the neighboring device is the type of device that typically shares content. Once it is determine that the neighboring device can share content, the computing device can determine a history of previous connections with the neighboring device. The computing device can determine a priority for sharing content with neighboring device relative to other devices. The computing device can determine the priority based on the history of the neighboring device and the history of other devices so that the devices with a likelihood of new content receive a higher priority.

The computing device can maintain a device record for each device contacted so that the efficiency of future connections is maximized. The device record can indicate whether a device is capable of sharing content. If capable of sharing content, the device record can include the history of content sharing with the device.

Figure 1A:
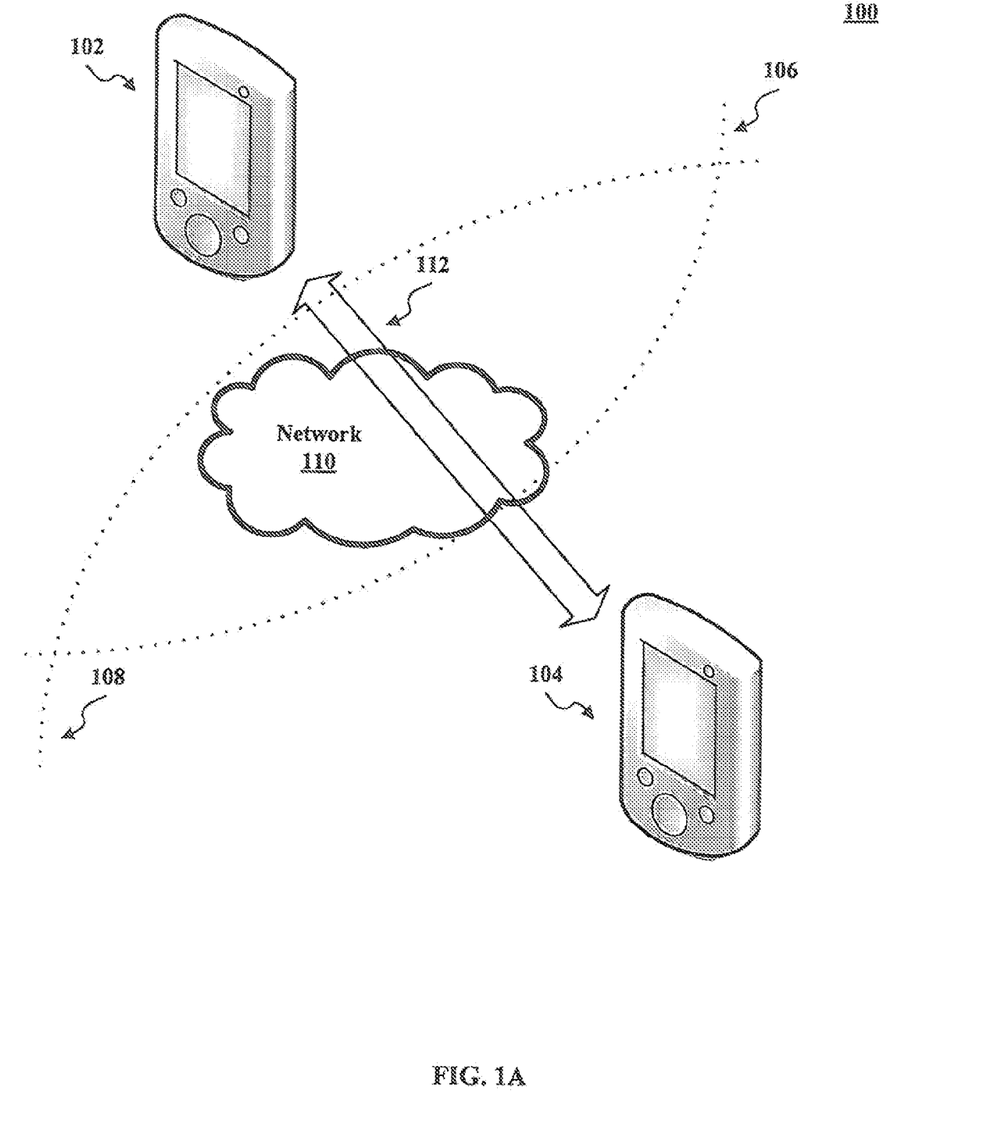
FIG. 1A is a generic diagram that illustrates examples of computing devices that share content, according to various implementations.
Figure 1B:
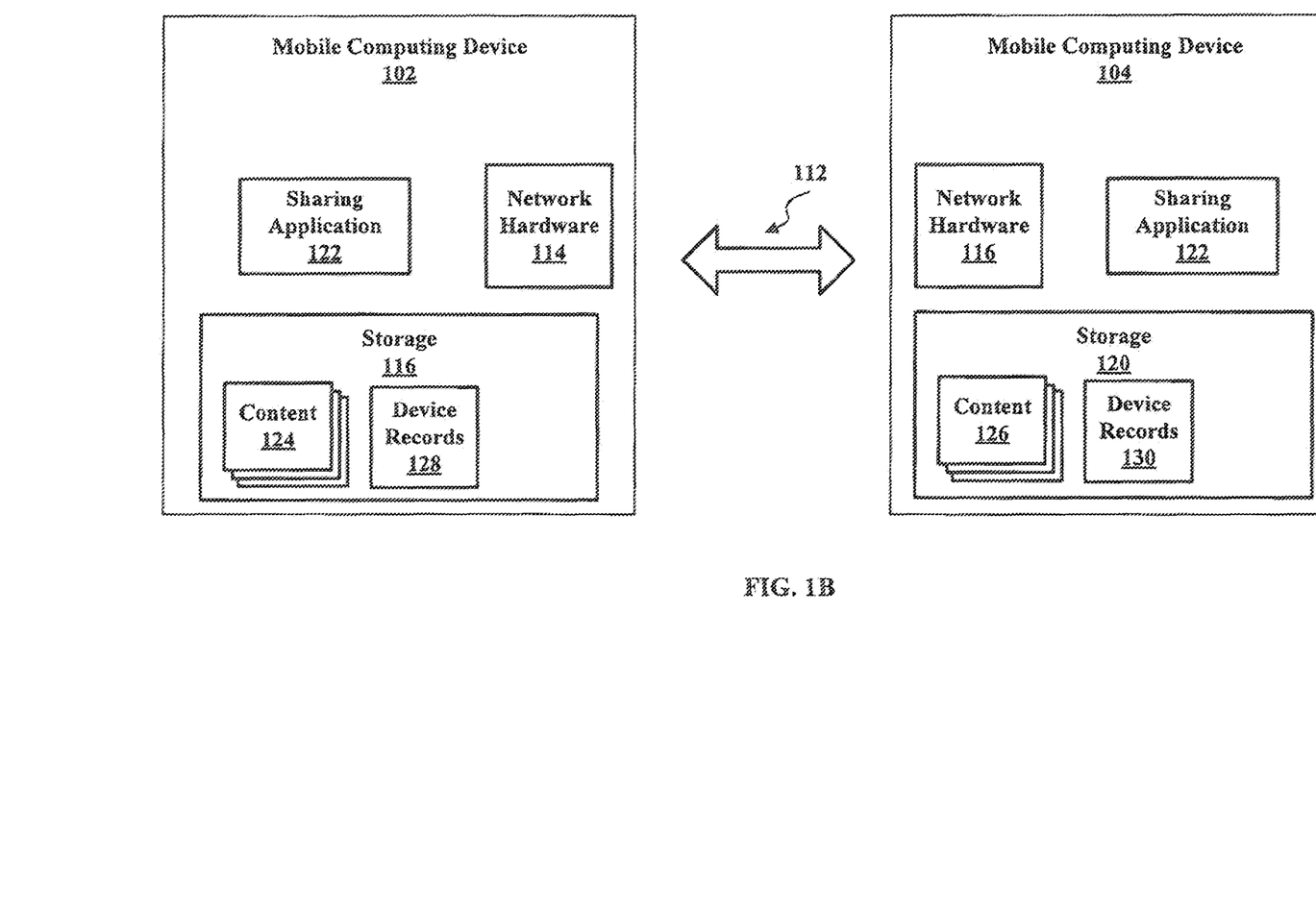
FIG. 1B is a generic diagram that illustrates a more detailed view of the computing devices that share content, according to various implementations.

Turning to an example, FIGS. 1A and 1B illustrate an example of an environment 100 in which two computing devices can discover each other in order to share content, according to various implementations. While FIG. 1A illustrates various systems, devices, and components contained in and related to the environment 100, FIG. 1A is one example of an environment and additional components can be added and existing components can be removed. Likewise, while FIG. 1B illustrates various components that can be include in the two computing device, FIG. 1B is one example of the components contained in the two computing devices and additional components can be added and existing components can be removed As illustrated in FIG. 1A, the environment 100 can include a mobile computing device 102 and a mobile computing device 104. The mobile computing device 102 can be any type of mobile computing device such a cellular telephone ("cell phone"), a smart cellular telephone ("smart phone"), a personal digital assistant ("PDA"), a laptop computer, a tablet computer, and the like. Likewise, the mobile computing device 104 can be any type of mobile computing device such a cell phone, a smart cellular telephone, a personal digital assistant, a laptop computer, tablet computer, and the like. While FIG. 1A illustrates a mobile computing device 102 and a mobile computing device 104, the processes and procedures described herein can be performed by any type of computing device that is capable of network communications.

As illustrated in FIG. 1B, the mobile computing device 102 can include network hardware 114 that enables the mobile computing device 102 to discover other computing devices and to establish a wireless network connection with other computing devices. The network hardware 114 can be configured to emit a signal that allows the mobile computing device 102 to discover other computing devices that are within a range (for example, a range 106 as illustrated in FIG. 1A) of the mobile computing device 102 and to establish a connection with the other computing devices. The network hardware 114 can be any type of network hardware configured to establish a network connection using any type of radio-frequency signal and/or optical signals, for example, Bluetooth, WiFi, Infrared, visible light, Nearfield Communication (NFC), and the like.

The mobile computing device 104 can also include network hardware 116 that enables the mobile computing device 104 to discover other computing devices and to establish a wireless network connection with other computing devices. The network hardware 116 can be configured to emit a signal that allows the mobile computing device 104 to discover other computing devices that are within a range (for example, a range 108 as illustrated in FIG. 1A) of the mobile computing device 104 and to establish a connection with the other computing devices. The network hardware 116 can be any type of network hardware configured to establish a network connection using any type of radio-frequency and/or optical signals, for example, Bluetooth, WiFi, Infrared, Visible Light, NFC, and the like.

The mobile computing devices 102 and the mobile computing device 104 can store content 124 and content 126 respectively. As used herein, "content" can be any type of digital information that can be stored on a computer-readable computing medium in any format for a computing system. For example, content can include video files, audio files, picture files, text files, application programs, and the like. In implementations, the users of the mobile computing device 102 and the mobile computing device 104 can desire to share content. For example, the users of the mobile computing device 102 and the mobile computing device 104 can desire to exchange picture files maintained by each user. Accordingly, as illustrated in FIG. 1A, the mobile computing device 102 and the mobile computing device 104 can establish a peer-to-peer network 110 in order to exchange content over a wireless connection 112.

In implementations, to improve the sharing of content and discovery of devices with which to share content, the mobile computing device 102 and the mobile computing device 104 can each include a copy of a sharing application 122. The copies of the sharing application 122 can be configured to communicate utilizing the network hardware 114 and the network hardware 116 to share content. To communicate, each copy of the sharing application 122 can be configured to discover other computing devices that include a copy of the sharing application and that are capable of communicating the share content. To achieve this, the sharing application 122 can include instructions, routines, algorithms, and the like to discover other computing devices and to establish the peer-to-peer network 110 and share content over the wireless connection 112 utilizing the process and procedures described below.

In implementations, when attempting to establish a peer-to-peer connection, the copies of the sharing application 122 can quickly discover compatible devices, which are capable of exchanging content, and remember them. The copies of the sharing application 122 can be configured to operate both as a server and a client. That is, the copies of the sharing application 122 can be configured to maintain an open listening socket to accept incoming connections, in addition to scanning for neighboring devices to make outgoing connections.

In implementations, when a neighboring device is discovered during a scan, the sharing application 122 can be configured to determine whether the neighboring device is capable of sharing content. The sharing application 122 can determine whether the neighboring device is the type of device that typically shares content. For example, when scanning for neighboring devices over a Bluetooth connection, devices whose Bluetooth type is not 'phone', such as mice, headsets, etc., are ignored for efficiency. Likewise, devices which never answer a request for connection will not be tried again for a period of time.

Once it is determine that the neighboring device can share content, the sharing application 122 can be configured to determine a history of previous connections with the neighboring device. From the history, the sharing application 122 can determine a priority for sharing content with neighboring device relative to other devices. The sharing application 122 can determine the priority based on the history of the neighboring device and the history of other devices so that the devices with a likelihood of new content receive a higher priority and efficiency is increased. A device whose status is 'interrupted' will be retried first because the device has more data to exchange and because the connection may be lost over time. Next, devices which did not answer or have not been contacted yet are tried. Finally, devices whose status is 'succeeded' can be tried again in case they have new content. These priorities ensure that new content from transient devices has the highest chance of being shared. Likewise, devices which have been synced successfully will not be retried until a certain amount of time has passed for efficiency. This is to prevent wasting time asking a device "What's new?" right after syncing with it, to ensure that other devices are tried instead.

The sharing application 122 can maintain a device record, for example, device record 128 in the mobile computing device 102 and device record 130 in the mobile computing device 104. The sharing application 122 can maintain a device record for each device with which a connection is made or attempted. The device record can indicate whether a device is capable of sharing content. If capable of sharing content, the device record can include the history of content sharing with the device. The device record can include a time the last connection was made or attempted, the status of the last interaction, and what time that interaction occurred. The record can include information from incoming and outgoing connections. By utilizing the device record, the sharing application 122 can discover devices while minimizing battery consumption by making as few scans and connections as possible. Likewise, the sharing application 122 can utilize the record to connect with devices that may no longer be discoverable. Devices which are present but no longer visible during a discovery scan can still be contacted, within a window of time, by MAC address stored in the record. This handles the case of devices which are no longer discoverable, or only appear intermittently in scans. After the window of time, the device can be assumed to no longer be present.

During operation, the copies of the sharing application 122 can be configured to allow a user of sharing application 122 to utilize and interact with the sharing application. As such, the sharing application 122 can include the necessary instructions, routines, algorithms, and the like that generate interfaces and allow communication via the interfaces so that the user can interact with the sharing application 122. For example, the sharing application can generate command-line and/or graphical user interfaces (GUIs) to allow the user to interact with the sharing application 122. Likewise, the sharing application 122 can be configured to automatically utilize a default filter without user configuration.

Figure 2:
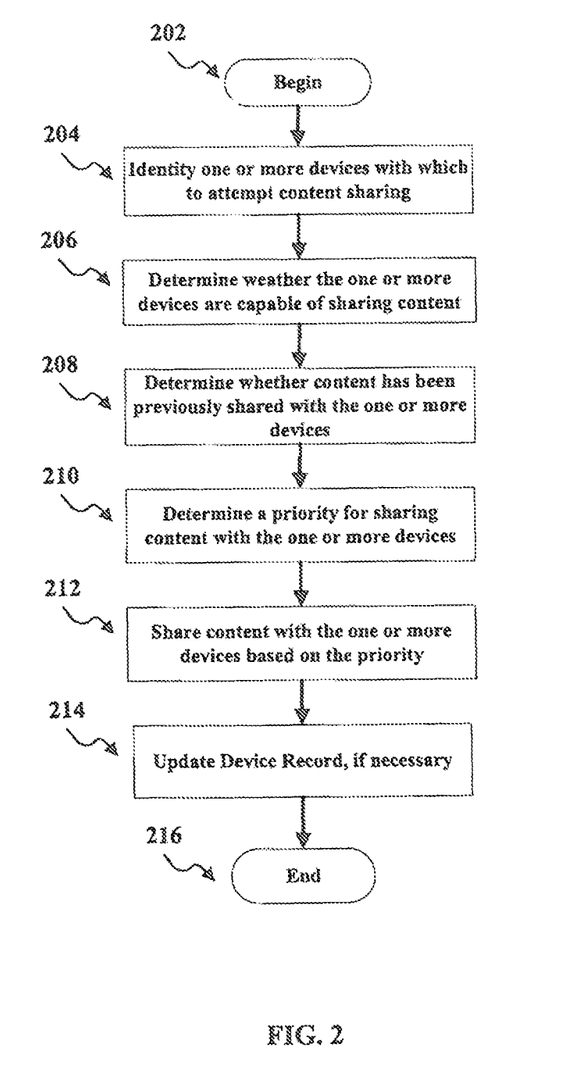
FIG. 2 is flow diagram that illustrates an example of a process of discovering devices with which to share content, according to various implementations.
Figure 3:
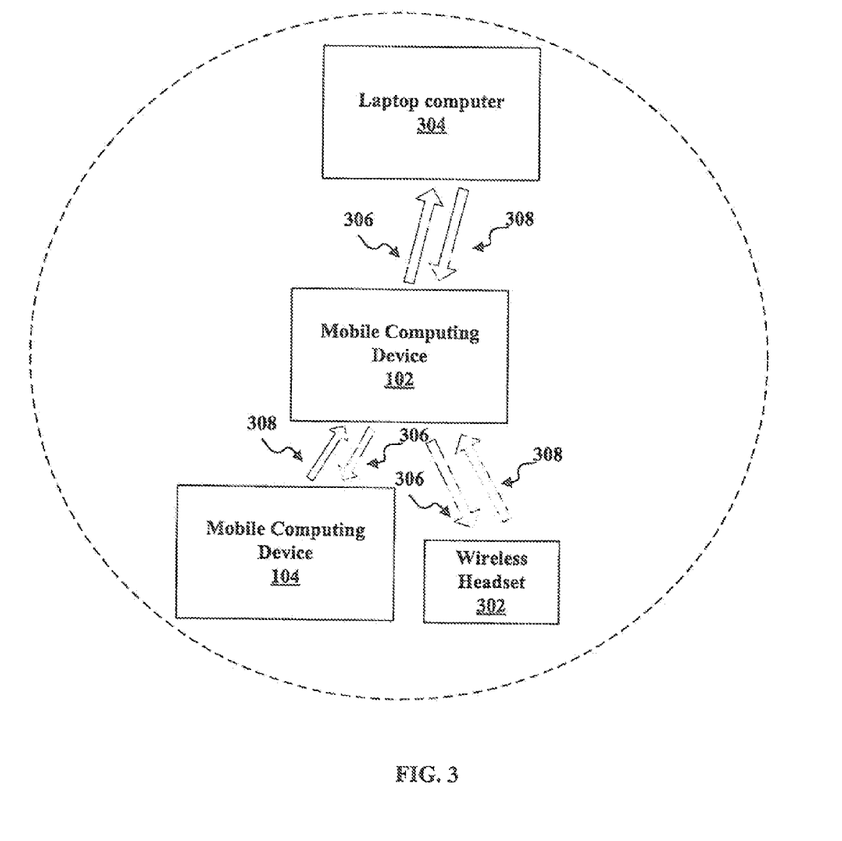
FIG. 3 is a diagram that illustrates an example of the process of discovering devices, according to various implementations.

FIGS. 2 and 3 illustrate an example of processes for discovering devices with which to share content, according to various implementations. While FIGS. 2 and 3 illustrate an example of a process that can be performed by the mobile computing device 102 as "the computing device", any of the stages of the processes can be performed by other systems and devices. Likewise, the illustrated stages of the process are examples, and any of the illustrated stages can be removed, additional stages can be added, and the order of the illustrated stages can be changed.

In 202, the process can begin. In 204, a computing device can identify one or more devices with which to attempt to establish a content sharing session. The computing device can send out a discovery signal to any device within range of the computing device. The computing device can send out the discovery signal on one or more wireless communication channels, such as WiFi, Bluetooth, etc., on which the computing device is capable of communicating. In response, any of the one or more devices, within range and capable of communicating on the one or more communication channels, can respond with information that describes or identifies device. The device information can include information such as unique device identifier, device type, and the like.

For example, as illustrated in FIG. 3, the mobile computing device 102 can be within range of the mobile computing device 104, a wireless headset 302, and a laptop computer 304. In this example, the mobile computing device 102 can broadcast a Bluetooth discovery signal 306. In response, each of the mobile computing device 104, the wireless headset 302, and the laptop computing 304 can respond with their Bluetooth information 308, such as media access control (MAC) address, Bluetooth device type, and the like.

In 206, the computing device can determine whether the one or more devices are capable of sharing content. The computing device can utilize the device record and/or the device information of each of the one or more devices in order to determine if the one or more devices are capable of sharing content. The computing device can examine the device record and determine whether a record exists for any of the one or more devices. If a record exists for any of the one or more devices, the computing device can examine the record and determine if the record indicates that the device is capable of sharing content. If the information on the device is not included in the device record, the computing device can examine the device information to determine if the one or more device are capable of sharing content. The computing device can determine, from the device type, whether the one or more devices are the type of device that shares content.

For instance, in the example illustrated in FIG. 3, the mobile computing device 102 can search the device record 128 for a record of the mobile computing device 104, the wireless headset 302, and the laptop computing 304. In this example, the mobile computing device 102 can determine that the device record 128 does not include a record for the wireless headset 302. As such, the mobile computing device 102 can examine the Bluetooth device information received from the wireless headset 302. The Bluetooth device information for the wireless headset 302 can include a device type "headset". In response, the mobile computing device 102 can determine that the wireless headset 302 is the type of device that does not include content and not attempt a connection with the wireless headset 302.

In 208, the computing device can determine if content has been previously shared with the one or more computing devices that are capable of sharing content. The computing device can examine the device record for each of the one or more devices capable of sharing content. The device record can include a history of connections with the one or more devices. The device record can include a time the last connection was made or attempted, the status of the last interaction, and what time that interaction occurred. The record can include information from incoming and outgoing connections.

In 210, the computing device can determine a priority for sharing content with the one or more devices that are capable of sharing content. The computing device can determine the priority based on the history of the neighboring device and the history of other devices so that the devices with a likelihood of new content receive a higher priority and efficiency is increased. A device whose status is 'interrupted' will be retried first because the device has more data to exchange and because the connection may be lost over time. Next, devices which did not answer or haven't been contacted yet are tried. Finally, devices whose status is 'succeeded' can be tried again in case they have new content. These priorities ensure that new content from transient devices has the highest chance of being shared. Likewise, devices which have been synced successfully will not be retried until a certain amount of time has passed for efficiency. This is to prevent wasting time asking a device "What's new?" right after syncing with it, to ensure that other devices are tried instead. Once a priority is determined in 210, the computing device can share content with the one or more devices according to the priority in 212.

In 214, the computing device can update the device record for the one or more devices, if necessary. The computing device can update the device record to include the status of the last interaction, what time the interaction occurred, whether the connection was successful, and the like. Likewise, the computing device can update the device record for the devices that were determined not capable of sharing content to indicate the devices cannot share content.

In 216, the process can end, return to any point or repeat.

Figure 4:
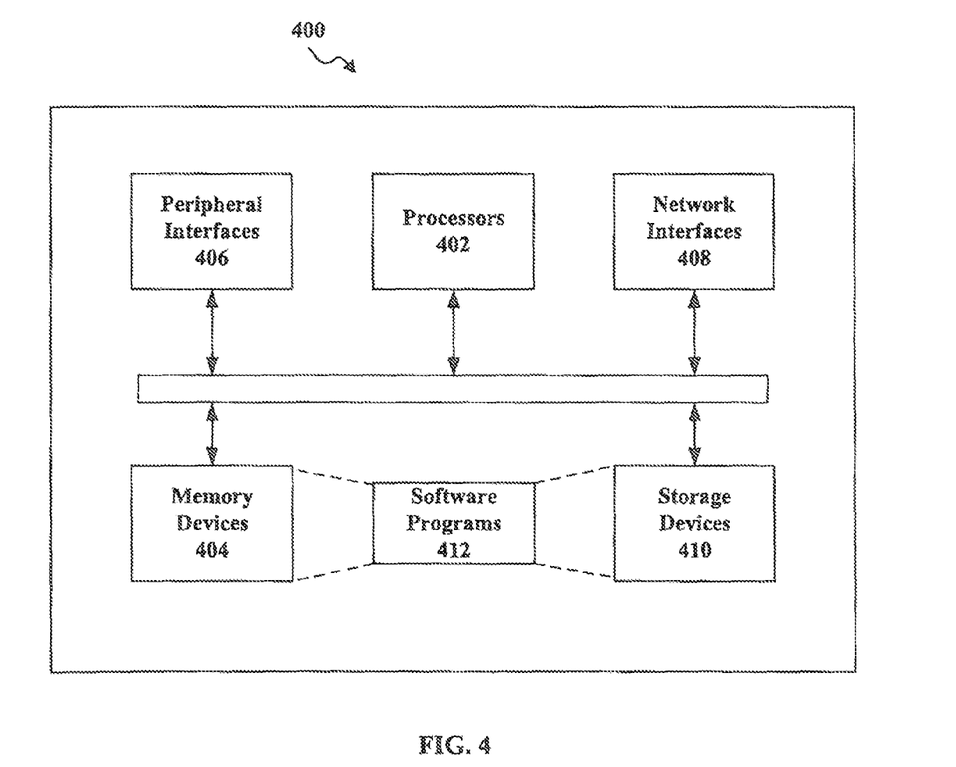
FIG. 4 is a generic block diagram that illustrates an example of a computing system that can run the operating system emulator, according to various implementations.

FIG. 4 is a diagram depicting an example of a hardware configuration for a computing device 400, such as the mobile computing system 102 and/or the mobile computing system 104, that execute copies of the sharing application 122 and can be used to perform one or more of the processes described above. While FIG. 4 illustrates various components contained in the computing device 400, FIG. 4 illustrates one example of a computing device and additional components can be added and existing components can be removed.

As illustrated in FIG. 4, the computing device 400 can include one or more processors 402 of varying core configurations and clock frequencies. The computing device 400 can also include one or more memory devices 404 that serve as a main memory during the operation of the computing device 400. The computing device 400 can also include one or more peripheral interfaces 406, such as keyboards, mice, touchpads, computer screens, touchscreens, etc., for enabling human interaction with and manipulation of the computing device 400.

The computing device 400 can also include one or more network interfaces 408 for communicating via one or more networks, such as Ethernet adapters, wireless transceivers, or serial network components, for communicating over wired or wireless media using protocols, such as Ethernet, wireless Ethernet, Global System for Mobile Communications (GSM), Enhanced Data rates for GSM Evolution (EDGE), Universal Mobile Telecommunications System (UMTS), Worldwide Interoperability for Microwave Access (WiMAX), Long Term Evolution (LTE), etc. The computing device 400 can also include one or more storage device 410 of varying physical dimensions and storage capacities, such as flash drives, hard drives, random access memory, etc., for storing data, such as images, files, and program instructions for execution by the one or more processors 402.

Additionally, the computing device 400 can include one or more software programs 412, such as the sharing application 122. The one or more software programs 412 can include instructions that cause the one or more processors 402 to perform the processes described herein. The one or more software programs 412 can be stored in the one or more memory devices 404 and/or on in the one or more storage devices 410. Likewise, the data, for example, the content 124, the content 126, the device record 128, and the device record 130, utilized by one or more software programs 412 can be stored in the one or more memory devices 404 and/or on in the one or more storage devices 410.

In implementations, the components of the computing device 400 need not be enclosed within a single enclosure or even located in close proximity to one another. Those skilled in the art will appreciate that the above-described componentry are examples only, as the computing device 400 can include any type of hardware componentry, including any necessary accompanying firmware or software, for performing the disclosed implementations. The computing device 400 can also be implemented in part or in whole by electronic circuit components or processors, such as application-specific integrated circuits (ASICs) or field-programmable gate arrays (FPGAs).

In situations in which the systems and methods discussed here store or share data of the user's computing device, the data can be treated in one or more ways before it is stored or used, so that personally identifiable information is removed. For example, a user's identify can be treated so that no personally identifiable information can be determined for the user, or a user's geographic location can be generalized where location information is shared, so that a particular location of a user cannot be determined. Thus, the user can have control over how data, about the user, is collected, stored, or shared.

Certain implementations described above can be performed as a computer applications or programs. The computer program can exist in a variety of forms both active and inactive. For example, the computer program can exist as one or more software programs, software modules, or both that can be comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Examples of computer readable storage devices and media include conventional computer system RAM (random access memory), ROM (read-only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Those skilled in the art will recognize that these and other variations are possible within the spirit and scope as defined in the following claims and their equivalents.

What is claimed is:

1. A method for discovering devices with which to share content, the method comprising:
    identifying, by a first computing device, a second device with which to attempt a peer-to-peer connection;
    determining that the second device is a device capable of sharing content;
    determining that a previous peer-to-peer connection was made with the second device;
    retrieving data reflecting the previous peer-to-peer connection, wherein the data comprises a time of the previous peer-to-peer connection;
    determining, based on the data, whether content sharing was successfully completed during the previous peer-to-peer connection; and
    determining a priority with which to attempt of the peer-to-peer connection with the second device relative to connections with other devices based on at least one of the time of the previous peer-to-peer connection and whether content sharing was successfully completed during the previous peer-to-peer connection.

2. The method of claim 1, wherein determining whether the second device is a device capable of sharing content, comprises:
    examining a record of devices not capable of sharing content for an identification of the second device.

3. The method of claim 1, the method further comprising:
    determining that a third device is not capable of sharing content; and
    determining not to attempt further peer-to-peer connections with the third device.

4. The method of claim 3, the method further comprising:
    determining that a record of devices does not include an identification of the third device; and
    adding the identification of the third device to the record of devices not capable of sharing content.

5. The method of claim 1, wherein determining the priority comprises:
    determining that the content sharing was not successfully completed during the previous peer-to-peer connection; and
    determining a first priority for the peer-to-peer connection with the second device relative to connections with other devices.

6. The method of claim 5, the method further comprising:
    determining that a previous peer-to-peer connection was not made with a third device; and
    determining a priority lower than the first priority for a peer-to-peer connection with the third device relative to the peer-to-peer connection with the second device.

7. The method of claim 1, the method further comprising:
    determining that a predetermined number of peer-to-peer connection attempts with a third device have been unsuccessful; and
    waiting a predetermined period of time before attempting further peer-to-peer connections with the third device.

8. The method of claim 1, the method further comprising:
    determining that the content sharing was successfully completed during the previous peer-to-peer connection;
    determining whether a predetermined period of time has elapsed since the time of the previous peer-to-peer connection; and
    attempting the peer-to-peer connection based on whether the predetermined period of time has elapsed since the time of the previous peer-to-peer connection.

9. A computer readable storage medium storing instructions for causing one or more processors to perform a method comprising:
    identifying, by a first computing device, a second device with which to attempt a peer-to-peer connection;
    determining that the second device is a device capable of sharing content;
    determining that a previous peer-to-peer connection was made with the second device;
    retrieving data reflecting the previous peer-to-peer connection, wherein the data comprises a time of the previous peer-to-peer connection;
    determining, based on the data, whether content sharing was successfully completed during the previous peer-to-peer connection; and
    determining a priority with which to attempt of the peer-to-peer connection with the second device relative to connections with other devices based on at least one of the time of the previous peer-to-peer connection and whether content sharing was successfully completed during the previous peer-to-peer connection.

10. The computer readable storage medium of claim 9, wherein determining whether the second device is a device capable of sharing content, comprises:
    examining a record of devices not capable of sharing content for an identification of the second device.

11. The computer readable storage medium of claim 9, the method further comprising:
    determining that a third device is not capable of sharing content; and
    determining not to attempt further peer-to-peer connections with the third device.

12. The computer readable storage medium of claim 11, the method further comprising:
    determining that a record of devices does not include an identification of the third device; and
    adding the identification of the third device to the record of devices not capable of sharing content.

13. The computer readable storage medium of claim 9, wherein determining the priority comprises:
    determining that the content sharing was not successfully completed during the previous peer-to-peer connection; and
    determining a first priority for the peer-to-peer connection with the second device relative to connections with other devices.

14. The computer readable storage medium of claim 13, the method further comprising:

determining that a previous peer-to-peer connection was not made with a third device; and determining a priority lower than the first priority for a peer-to-peer connection with the third device relative to the peer-to-peer connection with the second device.

15. The computer readable storage medium of claim 9, the method further comprising:

determining that a predetermined number of peer-to-peer connection attempts with a third device have been unsuccessful; and waiting a predetermined period of time before attempting further peer-to-peer connections with the third device.

16. The computer readable storage medium of claim 9, the method further comprising:

determining that the content sharing was successfully completed during the previous peer-to-peer connection;

determining whether a predetermined period of time has elapsed since the time of the previous peer-to-peer connection; and attempting the peer-to-peer connection based on whether the predetermined period of time has elapsed since the time of the previous peer-to-peer connection.

17. A computing device for discovering devices with which to share content, comprising:

one or more memory devices storing instructions; and one or more processors coupled to the one or more memory devices and configured to execute the instructions to perform a method comprising:

identifying a second device with which to attempt a peer-to-peer connection;

determining that the second device is a device capable of sharing content;

determining that a previous peer-to-peer connection was made with the second device;

retrieving data reflecting the previous peer-to-peer connection, wherein the data comprises a time of the previous peer-to-peer connection;

determining, based on the data, whether content sharing was successfully completed during the previous peer-to-peer connection; and determining a priority with which to attempt of the peer-to-peer connection with the second device relative to connections with other devices based on at least one of the time of the previous peer-to-peer connection and whether content sharing was successfully completed during the previous peer-to-peer connection.

18. The computing device of claim 17, wherein the one or more processors are configured to execute the instructions to perform the method further comprising:

determining that a third device is not capable of sharing content; and determining not to attempt further peer-to-peer connections with the third device.

19. The computing device of claim 17, wherein the one or more processors are configured to execute the instructions to perform the method further comprising:

determining that a predetermined number of peer-to-peer connection attempts with a third device have been unsuccessful; and waiting a predetermined period of time before attempting further peer-to-peer connections with the third device.

20. The computing device of claim 17, wherein the one or more processors are configured to execute the instructions to perform the method further comprising:

determining that the content sharing was successfully completed during the previous peer-to-peer connection;

determining whether a predetermined period of time has elapsed since the time of the previous peer-to-peer connection; and attempting the peer-to-peer connection based on whether the predetermined period of time has elapsed since the time of the previous peer-to-peer connection.

* * * * *